(12) United States Patent
Phillips et al.

(10) Patent No.: US 7,479,566 B2
(45) Date of Patent: Jan. 20, 2009

(54) METHOD FOR PREPARATION OF ALKOXYSILANES HAVING REDUCED HALIDE

(75) Inventors: Robert N. Phillips, Cardiff (GB); Charles L. Worcester, Lexington, IN (US)

(73) Assignee: Dow Corning Corporation, Midland, MI (US)

( * ) Notice: Subject to any disclaimer, the term of this patent is extended or adjusted under 35 U.S.C. 154(b) by 61 days.

(21) Appl. No.: 11/792,027

(22) PCT Filed: Dec. 16, 2005

(86) PCT No.: PCT/US2005/046320

§ 371 (c)(1),
(2), (4) Date: May 30, 2007

(87) PCT Pub. No.: WO2006/076137

PCT Pub. Date: Jul. 20, 2006

(65) Prior Publication Data

US 2008/0125600 A1    May 29, 2008

Related U.S. Application Data

(60) Provisional application No. 60/643,695, filed on Jan. 13, 2005.

(51) Int. Cl.
*C07F 7/20* (2006.01)
*C07F 7/18* (2006.01)

(52) U.S. Cl. .......... 556/443; 556/450; 556/451
(58) Field of Classification Search ........... 556/443, 556/450, 451
See application file for complete search history.

(56) References Cited

U.S. PATENT DOCUMENTS

| 3,853,933 | A | 12/1974 | Siciliano |
| 4,340,577 | A | 7/1982 | Sugawara et al. |
| 4,382,145 | A | 5/1983 | Yeboah |
| 5,075,479 | A | 12/1991 | Bokerman et al. |
| 5,276,173 | A | 1/1994 | Marko et al. |
| 5,483,040 | A | 1/1996 | Fortune |
| 2005/0239986 | A1 | 10/2005 | Geisberger et al. |
| 2006/0074189 | A1 | 4/2006 | Gammie |

FOREIGN PATENT DOCUMENTS

| EP | 0543665 | 5/1993 |
| EP | 0692513 | 8/1997 |
| EP | 1589056 | 11/2006 |
| WO | WO 01/34613 | 5/2001 |

*Primary Examiner*—Elvis O Price
(74) *Attorney, Agent, or Firm*—Matthew T. Fewkes

(57) ABSTRACT

Polysiloxane hydrolyzates are neutralized by treating polysiloxane hydrolyzates containing residual acidic constituents with carbon, and then the carbon is removed from the treated neutralized polysiloxane hydrolyzate. Some examples of polysiloxane hydrolyzates that can be treated are hydride functional polysiloxane hydrolyzates and polydiethylsiloxane hydrolyzates. The carbon neutralizing agent especially preferred is carbon derived from bituminous coal. The carbon is removed from the treated neutralized polysiloxane hydrolyzate by passing it through solid liquid separation devices such as plate and frame filter presses, polishing filters, and post filters for removing fines.

9 Claims, 1 Drawing Sheet

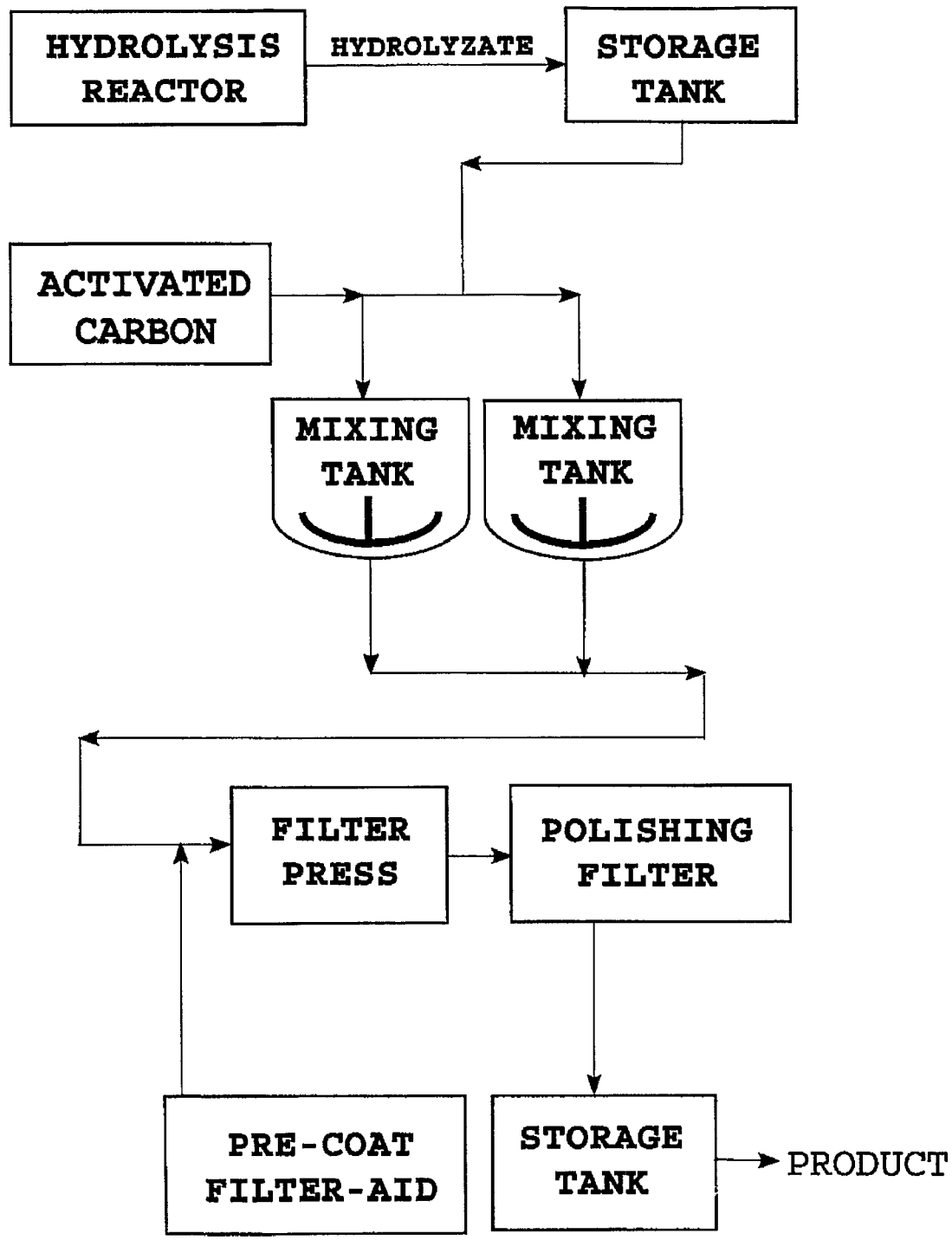

US 7,479,566 B2

METHOD FOR PREPARATION OF ALKOXYSILANES HAVING REDUCED HALIDE

CROSS REFERENCE TO RELATED APPLICATIONS

This application is a U.S. national stage filing under 35 U.S.C. §371 of PCT Application No. PCT/US2005/046320 filed on Dec. 16, 2005, currently pending, which claims the benefit of U.S. Provisional Patent Application No. 60/643695 filed Jan. 13, 2005, under 35 U.S.C. §119(e). PCT Application No. PCT/US2005/04632 and U.S. Provisional Patent Application No. 60/643695 are hereby incorporated by reference.

BACKGROUND OF THE INVENTION

This invention is directed generally to polysiloxane hydrolyzates, and is an improvement over existing methods of neutralizing and/or purifying polysiloxane hydrolyzates. In particular, hydride functional linear, branched and/or cyclic polysiloxane (≡Si—H) hydrolyzates, and linear, branched and/or cyclic polydialkylsiloxane hydrolyzates such as polydimethylsiloxane (PDMS) hydrolyzates, are more efficiently neutralized and purified according to the invention.

The hydrolysis of chlorosilanes is known in the art, and reference may be had to U.S. Pat. No. 4,382,145 (May 3, 1983), and pending U.S. patent application Ser. No. 10/958,768, filed on Oct. 5, 2004, entitled "Hydrolysis of Chlorosilanes", that represent the state of the art. The '145 patent and the pending application are directed to general processes for producing polysiloxane hydrolyzates from chlorosilanes. U.S. Pat. No. 5,075,479 (Dec. 24, 1991) describes a hydrolysis process for producing PDMS hydrolyzates, whereas U.S. Pat. No. 5,493,040 (Feb. 20, 1996) relates to a hydrolysis process for producing hydride functional polysiloxane hydrolyzates.

Typically, hydrolyzates containing cyclic and linear hydride functional polysiloxanes are obtained by hydrolyzing $CH_3SiHCl_2$ and $(CH_3)_3SiCl$. The hydrolyzate is neutralized with sodium bicarbonate to remove trace levels of chlorine based species, particularly chloride ions in the form of hydrochloric acid (HCl) and then used in the preparation of higher molecular weight hydride functional polysiloxane polymers. Hydrolyzates containing cyclic and linear PDMS are obtained by hydrolyzing $(CH_3)_2SiCl_2$ with or without either $(CH_3)_3SiCl$ or an endblocking oligomer such as $(CH_3)_3SiO$ $[(CH_3)_2SiO]_{0-10}$. The hydrolyzate is typically neutralized with sodium bicarbonate to remove trace chlorine based species such as HCl and then used in the preparation of higher molecular weight polydimethylsiloxane polymers. U.S. Pat. No. 5,276,173 (Jan. 4, 1994) describes the removal of ionic chloride from hydroxyl-terminated siloxane compounds by contacting the siloxane with a molecular sieve material.

Quite unexpectedly, it has been discovered that the use of carbon instead of sodium carbonate or sodium bicarbonate for neutralizing and purifying polysiloxane hydrolyzates is beneficial in that it produces a reduction in the cycle time normally needed for neutralization and purification of these hydrolyzates. In the case of PDMS hydrolyzates, it was also found to reduce the viscosity drift of the resulting PDMS polymers. This was particularly surprising as carbon manufacturers were of the opinion that carbon should not be appropriate for this purpose.

BRIEF SUMMARY OF THE INVENTION

This invention is directed to a method of neutralizing a polysiloxane hydrolyzate comprising treating a polysiloxane hydrolyzate containing residual acidic constituents with carbon, and separating the carbon from the treated neutralized polysiloxane hydrolyzate.

The polysiloxane hydrolyzates can be, for example, a hydride functional polysiloxane hydrolyzate or a polydialkylsiloxane hydrolyzate such as a polydimethylsiloxane hydrolyzate. Any suitable carbon neutralizing agent may be used. The carbon neutralizing agent may, for example, comprise and preferably consists of any one or more of coke, charcoal, activated carbon, carbon derived from bituminous coal, carbon derived from anthracite coal, carbon derived from lignite, carbon derived from wood, carbon derived from peat, and carbon derived from coconut shells. Carbon derived from bituminous coal is preferred.

The carbon neutralizing agent may be brought into contact with the hydrolyzate by any suitable means such as by mixing the carbon and hydrolyzate in a mixing tank and then removing the carbon from the treated neutralized polysiloxane hydrolyzate by passing it through any conventional type of solid liquid separation device. A preferred solid liquid separation device is a plate and frame filter press, followed by treatment of the filtered effluent by any suitable means for removing particulate (especially carbon) fines to a level appropriate for the specification required for the hydrolyzate such as a suitable so-called polishing filter. Devices other than plate and frame filter presses and polishing filters can also be used. For example, the polysiloxane hydrolyzate may be passed through a fixed bed of the carbon neutralizing agent using a suitable predetermined residence time, from which the hydrolyzate is passed to a post filter to remove carbon fines from the effluent. A further alternative process may include the use of one or more carbon impregnated filters to filter the hydrolyzate. These and other features of the invention will become apparent from a consideration of the detailed description.

BRIEF DESCRIPTION OF THE DRAWING

The single drawing FIGURE is a simplified functional representation of the process according to the invention, in which the flow pattern of the materials through the various pieces of equipment is illustrated.

DETAILED DESCRIPTION OF THE INVENTION

In general, the chlorosilane feed for hydrolysis processes contains chlorosilanes of the formula $R_2SiCl_2$. Each R may be the same of different, but is usually the same and may be any suitable group such as, for example, hydrogen or a hydrocarbon radical such as an alkyl group, a cycloalkyl group, an aryl group, an alkylaryl group, or an aralkyl group containing 1-20 carbon atoms. The hydrocarbon radical may be a group such as methyl, ethyl, propyl, isopropyl, n-butyl, isobutyl, tert-butyl, sec-butyl, pentyl, hexyl, phenyl, tolyl, benzyl, and beta-phenylethyl. Some examples of suitable chlorosilanes include compounds such as dimethyldichlorosilane $(CH_3)_2SiCl_2$, diethyldichlorosilane $(C_2H_5)_2SiCl_2$, di-n-propyldichlorosilane $(n-C_3H_7)_2SiCl_2$, di-i-propyldichlorosilane $(i-C_3H_7)_2SiCl_2$, di-n-butyldichlorosilane $(n-C_4H_9)_2SiCl_2$, dii-butyldichlorosilane (i-$C_4H_9$)$_2$SiCl$_2$, di-t-butyldichlorosilane (t-$C_4H_9$)$_2$SiCl$_2$, n-butylmethyldichlorosilane $CH_3$(n-$C_4H_9$)SiCl$_2$, octadecylmethyldichlorosilane $CH_3$($C_{18}H_{37}$) SiCl$_2$, diphenyldichlorosilane ($C_6H_5$)$_2$SiCl$_2$, phenylmethyldichlorosilane $CH_3$($C_6H_5$)SiCl$_2$, dicyclohexyldichlorosilane ($C_6H_{11}$)$_2$SiCl$_2$, and methyldichlorosilane $CH_3$SiHCl$_2$. The preferred chlorosilanes are dimethyldichlorosilane and methyldichlorosilane $CH_3$HSiCl$_2$. Trialkylchlorosilanes $R_3$SiCl can also be used where R is the same as defined above. A preferred trialkylchlorosilane, for example, is trimethylchlorosilane ($CH_3$)$_3$SiCl.

While most hydrolysis processes seek to reduce the HCl content of the hydrolyzate, it is typically necessary to further reduce the content of chlorine based species such as HCl by neutralization in order to assure product stability. This is because the presence of hydrolyzable HCl levels in most crude hydrolyzate products exceeds levels necessary to prevent further polymerization and increase in viscosity of linear oligomers in the hydrolyzate, i.e., viscosity drift. By selecting carbon as the neutralizing agent according to the present invention, this neutralization can be performed in a more efficient manner. For example, the cycle time for neutralization and the cycle time for neutralization and filtration, using carbon in comparison to sodium bicarbonate, has been reduced upwards of 39 percent and 27 percent, respectively.

The carbon used in the neutralization and purification process herein may be carbon in any convenient form and of any suitable particle size. Examples include coke, charcoal, activated carbon, carbon derived from bituminous coal, carbon derived from anthracite coal, carbon derived from lignite (brown coal), carbon derived from wood, carbon derived from peat, or carbon derived from coconut shells. Carbon derived from bituminous coal is preferred herein because it is readily available commercially and is relatively inexpensive. In a first embodiment of the present invention the carbon may be added to the polysiloxane hydrolyzate, mixed, and then separated. In a second embodiment the polysiloxane hydrolyzate may be passed through a fixed bed of carbon from which carbon fines are subsequently removed.

One carbon species which may be used in the process of the invention is a granular bituminous-based activated carbon sold under the trademark BPL® 80X270 by Calgon Carbon Corporation, Pittsburgh, Pa. This material consists of carbon particles of a size that will pass through an 80 mesh screen but that are retained on a 270 mesh screen. The average particle size is greater than 53 micron (μm) and less than 180 (μm).

An alternative suitable carbon species is a granular bituminous-based activated carbon sold by Calgon Carbon Corporation under their trademark BPL® 12X30. This material consists of carbon particles of a size that will pass through a 12 mesh screen but that are retained on a 30 mesh screen. The average particle size is greater than 550 micron (μm) and less than 1410 (μm). The BPL® 12X30 had a moisture level of about 2-10 percent.

With reference to the drawing, which depicts the first embodiment of the method according to the present invention, crude hydrolyzate product containing residual levels of chlorine containing species such as HCl is obtained from a hydrolysis reactor that is part of a hydrolysis process generally represented by U.S. Pat. No. 4,382,145, U.S. application Ser. No. 10/958,768, U.S. Pat. Nos. 5,075,479, and 5,493,040, referred to above. The hydrolyzate is pumped into a storage tank, from which it is fed into one or more mixing tanks of suitable capacity, each with a capacity of about 1,000-2,000 gallons (4.546-9.092 m$^3$)). The neutralizing and purifying agent, i.e., activated carbon, is fed into each mixing tank where it is thoroughly dispersed in the crude hyrolyzate, to effect neutralization of residual chlorine containing species, in particular HCl to acceptable levels.

Neutralized hydrolyzate from the mixing tanks is passed into a plate and frame filter press having a stack of filter plates covered with filter cloths that have been pre-coated with a suitable filter-aid. The activated carbon, as well as other particulate impurities that may be in the neutralized hydrolyzate, are removed and retained on the coated filter cloths. The neutralized and filtered hydrolyzate is pumped under pressure through a suitable filter for the removal of fine particulates to a level required dependent of the requirements of the product being filtered. As previously indicated, other devices may be used. For example, the polysiloxane hydrolyzate may be passed through a fixed bed comprising the carbon neutralizing material, and then the carbon fines may be subsequently removed from the neutralized hydrolyzate using a suitable particulate fines filter.

EXAMPLES

The following examples are set forth in order to illustrate the invention in more detail.

Example 1

Treatment of a Hydride Functional Polysiloxane Hydrolyzate

In this example, a series of five (5) runs were conducted using equipment generally as depicted in FIG. 1. In each run, a 17,500 pound (7938 kg) batch of hydrolyzate at ambient temperature was treated. Approximately 20 pounds (10.872 kg) of activated carbon was fed into each of the mixing tanks for each of the runs. The mixing tanks were maintained at atmospheric pressure. The activated carbon was the granular bituminous-based activated carbon, BPL® 80X270 sold by Calgon Carbon Corporation, as described above. The slurry of hydrolyzate and activated carbon was agitated for about four hours. The product was analyzed to determine its acid number as a measure of neutralization of HCl. The analysis used was a technique generally equivalent to that described in ASTM Test Methods D 664 and D 974. This method is designed to determine the concentration of acidic constituents in organic or organosilicon compound. Indicators such as bromocresol purple (BCP) or potentiometric measurements are made to determine the endpoint. Samples are swirled in a titration vessel and titrated with standard potassium hydroxide (KOH) as required to return the solution to neutral color. The results are reported as acid numbers expressed in milligrams of KOH per gram of product. The result of these runs is shown in Table 1.

TABLE 1

Comparative Acid Number as Milligrams of KOH per gram of Product

| Example 1 | Acid Number of Crude Hydrolyzate | Acid Number Using Sodium Bicarbonate | Acid Number Using Activated Carbon |
|---|---|---|---|
| Run 1 | 0.0035 | 0.0017 | 0.0000 |
| Run 2 | 0.0035 | 0.0026 | 0.0000 |
| Run 3 | 0.0035 | 0.0024 | 0.0000 |
| Run 4 | 0.0035 | 0.0012 | 0.0000 |
| Run 5 | 0.0035 | 0.0027 | 0.0000 |

It can be seen in Table 1, that neutralization of the hydrolyzate with activated carbon was significantly more effective than neutralization with sodium bicarbonate. In a separate determination, it was found that the time required to complete each cycle of neutralization averaged about 7.75 hours when using sodium bicarbonate, and about 4.75 hours when using activated carbon, a reduction in cycle time of about 39 percent with activated carbon. The time required to complete each cycle of neutralization and filtration averaged about 11 hours when using sodium bicarbonate, and about 8 hours when using activated carbon, a reduction in cycle time of about 27 percent with activated carbon.

Example 2

20 gram of each solid neutralising agent/absorbent was added to 40 gram of un-neutralized trimethylsiloxy terminated methyl hydrogen siloxane having a viscosity of 30 mm²/s. The resulting mixture was shaken on an orbital shaker for 15 minutes and then allowed to settle for 30 minutes before passing through a pre-filter containing Glass Fibre Acrodisc Gelinan No. 4253 1 µm, and then filtering using either (i) a polytetrafluoroethylene (PTFE) Whatman 1 µm TF hydrophobic filter, or (ii) a polysulphone (PS) Whatman 1 µm AS hydrophilic filter. A sample of the resulting neutralized and filtered trimethylsiloxy terminated methylhydrogen siloxane was analysed by ion chromatography to determine the presence of residual hydrochloric acid. The carbon used in this example was the granular bituminous-based activated carbon BPL® 80X270 sold by Calgon Carbon Corporation and used in the previous example. The results showing the variation in efficiency of different solid neutralizing agents are compared in Table 2.

TABLE 2

| Neutralizing Agent/Absorbent | Filter | ppm of HCl |
|---|---|---|
| None | None | 1.230 |
| Carbon | PTFE | 0.000 |
| Carbon | PS | 0.017 |
| Silica Gel | PTFE | 0.061 |
| Silica Gel | PS | 0.045 |
| CaCO₃ (fine) | PTFE | 0.088 |
| CaCO₃ (fine) | PS | 0.032 |
| CaCO₃ (plant) | PTFE | 0.025 |
| CaCO₃ (plant) | PS | 0.023 |
| Na₂CO₃ | PTFE | 0.042 |
| Na₂CO₃ | PS | 0.019 |
| MgO | PTFE | 0.028 |
| MgO | PS | 0.024 |

It will be appreciated that the results shown in Table 2 using carbon and a PTFE filter as the neutralizing agent/absorbent are significantly better than the other neutralizing agent/absorbents.

Example 3

To ensure that carbon was the best neutralising agent/absorbent, a similar test was run using the test method described in Example 1, but in this case the results being shown in terms of ppm HCl. 20 gram of each solid neutralising agent/absorbent was added to 60 gram of un-neutralized trimethylsiloxy terminated methylhydrogen siloxane having a viscosity of 30 mm²/s. The resulting mixture was shaken on an orbital shaker for 2 minutes, and then allowed to settle for 10 minutes, before passing it through a Glass Fibre Acrodisc Gelinan No. 4253 1 µm hydrophilic filter (GF), and/or then filtering using either (i) a polytetrafluoroethylene (PTFE) Whatman 1 µm TF hydrophobic filter. A sample of the resulting neutralized and filtered trimethylsiloxy terminated methylhydrogen siloxane was analysed using a BCP indicator to determine the titration end point. Results showing the variation in efficiency of different solid neutralising agent are compared in Table 3.

TABLE 3

| Neutralizing Agent/Absorbent | Filter | ppm of HCl |
|---|---|---|
| None | TF | 12.3 |
| None | GF | 9.9 |
| Carbon | GF/TF | 0.9 |
| CaCO₃ | TF | 5.1 |
| CaCO₃ | GF | 3.8 |
| Na₂CO₃ | TF | 1.0 |
| MgO | TF | 2.3 |

While sodium carbonate appears to be similar in efficiency to the carbon used, it also has some negative consequences not apparent from these results. For example, the neutralizing effect of sodium carbonate works by means of a chemical reaction resulting in the formation of a calcium chloride contaminant in the siloxane. It is believed that carbon substantially works by means of adsorption, and is easy to separate from the siloxane by filtration after the mixing process is complete, thereby minimizing the level of contamination.

The following examples relate to the carbon treatment of PDMS hydrolyzate to reduce the HCl content, and to thereby minimize the water content typically present in the PDMS. For example, it is known that a condensation reaction, caused by the presence of HCl, leads to the formation of water, that results in an increase in the viscosity of PDMS over time, i.e., so-called viscosity drifting. The HCl content of PDMS is believed to be the cause of this undesirable condensation reaction.

Example 4

In this example, HCl was removed from PDMS containing water at low parts per million (ppm) levels. After treatment with carbon, it was observed that there was less hydrolysable HCl, and this phenomenon was unexpected. The neutralizing agent used in this example was a granular bituminous-based activated carbon sold under the trademark BPL® 12X30 by Calgon Carbon Corporation, Pittsburgh, Pa. This material consists of carbon particles of a size that will pass through a 12 mesh screen but that are retained on a 30 mesh screen. The average particle size is greater than 550 micron (µm) and less than 1410 (µm). The BPL® 12X30 had a moisture level of about 2-10 percent. 10 gram of the carbon was added to 300 gram of PDMS. This slurry was bottle rolled for 2 hours, allowed to settle, and the PDMS was decanted from the slurry. This procedure was repeated using 10 gram of dried carbon. It was determined that the both the un-dried and dried carbons removed the hydrolyzable HCl from 0.23 ppm to 0.03 ppm.

The results were determined analytically by means of an ion chromatographic method that is typically used for the separation of anions and cations in aqueous samples, using a conductivity detector for detection, and external standard calibrations for the quantitative analysis. Either a suppressed or a non-suppressed background conductivity mode of operation may be specified with the conductivity detection. The results are reported as parts per million (ppm) or parts per billion (ppb), on a weight/weight basis.

Example 5

Example 4 was repeated, except that the PDMS was passed through a 30 milliliter packed bed of the same carbon neutralizing agent with a residence time of 6 minutes. The HCl content of the feed PDMS was 0.28 ppm. After 3 hours, the treated PDMS exiting the bed contained on average 0.05 ppm HCl. This procedure was repeated using a residence time of 40 minutes, and the average HCl content of PDMS was reduced from 0.15 ppm to 0.03 ppm after 9 hours.

Example 6

Using the procedure of Example 5, several different media were evaluated using a 15 minute residence time, and the average HCl reduction was calculated over a 6 hour period, as the PDMS was passed through each media. The results of these evaluations are shown below in Table 4. It can be seen in Table 4 that carbon was the most effective. Amberlyst® A26 is a strongly basic macroreticular anionic resin having a quaternary ammonium functional group and a pore-diameter of $400\text{-}700 \times 10^{-10}$ m available from Rohm & Haas Company, Philadelphia, Pa. Amberlyst® A21 is a weakly basic macroreticular anionic resin having an amino-functional group and an average pore size of $900\text{-}1300\ 10^{-10}$ m. Molecular Sieve X 13 has a formula approximately corresponding to $Na_{86}[(AlO_2)_{86}(SiO_2)_{106}]XH_2O$. It has a bulk density of 600-700 kg m$^{-3}$, a nominal pore size of $10 \times 10^{-10}$ m, and is a product available from UOP LLC, Des Plaines, Ill., USA.

TABLE 4

| Neutralizing Agent/Absorbent | Percent HCl Removed |
| --- | --- |
| Molecular Sieve X13 | 48 |
| MgO | 64 |
| Amberlyst ® A26 | 72 |
| Carbon | 81 |
| Amberlyst ® A21 | 89 |

While Example 6 and Table 4 show that Amberlyst® A21 removed slightly more HCl than carbon, there are reasons why carbon is more suitable for this invention. For example, carbon has a lower initial unit cost, its use involves no addition of contaminants, and it is capable of removing other impurities from PDMS streams such as sulfur. Amberlyst® A21 on the other hand has a slight odour upon its first usage that taints the hydrolyzate.

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A method of neutralizing a polysiloxane hydrolyzate comprising treating a polysiloxane hydrolyzate containing residual acidic constituents with carbon selected from the group consisting of coke, charcoal, carbon derived from bituminous coal, carbon derived from anthracite coal, carbon derived from lignite, carbon derived from wood, carbon derived from peat, and carbon derived from coconut shells, and separating the carbon from the treated neutralized polysiloxane hydrolyzate.

2. A method according to claim 1 wherein the polysiloxane hydrolyzate is a hydride functional polysiloxane hydrolyzate or a polydialkylsiloxane hydrolyzate.

3. A method according to claim 2 wherein the polydialkylsiloxane hydrolyzate is a polydimethylsiloxane hydrolyzate.

4. A method according to claim 1 wherein the carbon is carbon derived from bituminous coal.

5. A method according to claim 4 wherein the carbon is a granular bituminous-based activated carbon containing carbon particles of a size that will pass through an 80 mesh screen but that are retained on a 270 mesh screen, or a granular bituminous-based activated carbon containing carbon particles of a size that will pass through a 12 mesh screen but that are retained on a 30 mesh screen.

6. A method according to claim 5 wherein the average particle size of the carbon is greater than 53 µm and less than 180 µm, or the average particle size is greater than 550 µm and less than 1410 µm.

7. A method according to claim 1 wherein the carbon is removed from the treated neutralized polysiloxane hydrolyzate by passing it through a plate and frame filter press, and then passing the filtered hydrolyzate through a polishing filter to remove particulate fines.

8. A method according to claim 1 wherein the polysiloxane hydrolyzate is passed through a fixed bed of carbon, and the neutralized polysiloxane hydrolyzate is filtered to remove carbon fines.

9. A method according to claim 1 wherein the polysiloxane hydrolyzate is passed through one or more carbon impregnated filters.

\* \* \* \* \*